April 30, 1940.   C. O. J. MONTELIUS   2,198,786
POWER TRANSMISSION TO OR FROM A FLUID
Filed May 5, 1937

INVENTOR:
CARL OSCAR
JOSEF MONTELIUS
BY Haseltine Lake & Co.
ATTORNEYS

Patented Apr. 30, 1940

2,198,786

UNITED STATES PATENT OFFICE 2,198,786

POWER TRANSMISSION TO OR FROM A FLUID

Carl Oscar Josef Montelius, Stockholm, Sweden, assignor to Aktiebolaget Imo-Industri, Stockholm, Sweden, a corporation of Sweden Application May 5, 1937, Serial No. 140,875
In Sweden February 7, 1935

2 Claims. (Cl. 103—128)

In United States Patent No. 1,698,802 a power transmission to or from a fluid is disclosed which may be used as pump, compressor, motor or meter and which comprises a number of intermeshing revoluble screws disposed in a housing fitting to the outside perimeter of the screws, the cooperating helical surfaces of the thread of the screws being each generated by the outer edge line of the helical surface of the adjacent screw and the helical surfaces of the thread of the one screw being substantially convex whereas those of the co-operating screw being substantially concave.

In United States Patent No. 1,821,523 an improvement of this device is disclosed according to which the outer edge of the thread of the screw having concave helical surfaces is shaped as a rolling surface bearing against the root of the thread of the screw having convex helical surfaces.

The present invention relates to an improvement of the device disclosed in the above said Patent No. 1,698,802 and has for its principal object to reduce the leakage and thereby to increase the efficiency of such devices.

Another object of the invention is to provide a device of the class described in which of each pair of cooperating screws the helical surfaces of the thread of the one screw are convex, whereas those of the other screw are concave towards the root of the thread but rounded towards the top of the thread.

Still another object of the invention is to provide a device of the class described in which the convex helical surfaces of the one screw bear not on the outer edge of the intermeshing screw but on a rounded part on the helical surfaces of said screw, whereas the concave helical surfaces of the thread of the latter screw bear on the outer edge of the helical surfaces of the thread of the former screw.

A still further object of my invention is to provide a device of the class described having at least a pair of intermeshing and cooperating revoluble screws one of which is a power screw and has a convex helical surfaces and the other an idle screw having helical surfaces which are concave towards the root of the thread and rounded towards the top of the thread.

These and further objects of the invention will be apparent according as the following description proceeds reference being had to the accompanying drawing showing by way of example some embodiments thereof.

Figure 1:
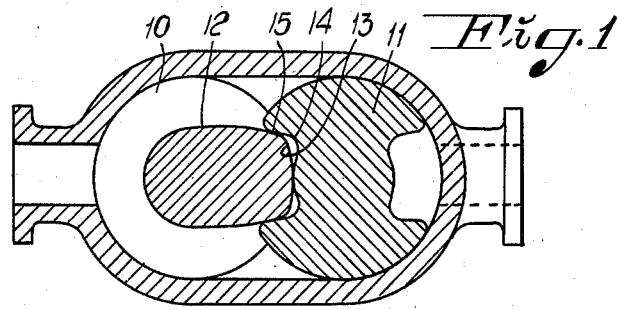
Figures 1 and 2 are cross-sectional views of screw sets according to the invention.

In Fig. 1 reference numeral 10 designates a single-thread power screw and 11 a double-thread idle screw. Screw 10 is provided with convex helical surfaces 12, the outer edges of which have a relatively short rounded portion 13, whereas the idle screw 11 has helical surfaces which within a given diameter have a concave part 14 and outside said diameter a relatively short rounded part 15.

Figure 2:
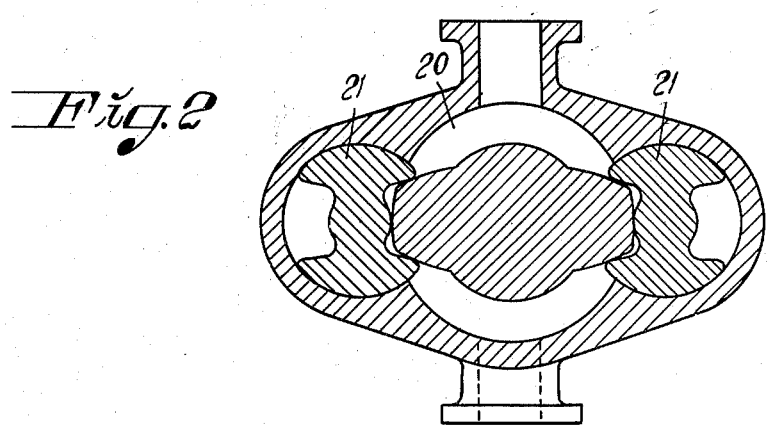

In Fig. 2, reference numeral 20 designates a power screw cooperating with two double-thread idle screws 21, the helical surfaces of the screws being formed in accordance with the description of Fig. 1.

Figure 3:
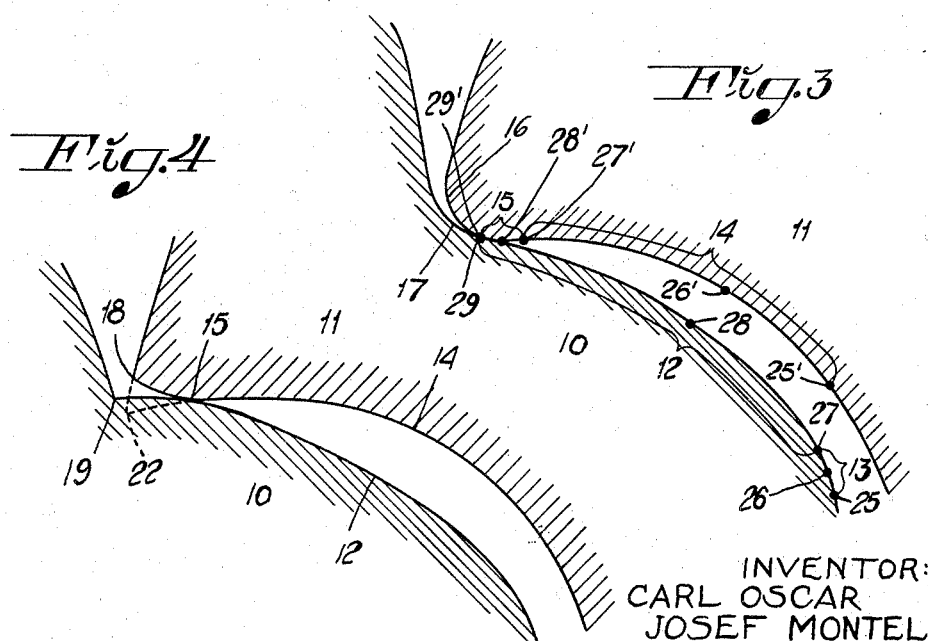
Figure 3 is a cross sectional view on an enlarged scale of a part of the screw set shown in Fig. 2.

Fig. 3 illustrates how the contact between the helical surfaces of the screws takes place in Fig. 2. The convex helical surface 12 of the power screw 10 is shaped to engage with the rounded part 15 of the helical surface of the idle screw 11, whereas the concave part 14 of the helical surface of the idle screw 11 is shaped to engage with the outer edge 13 of the helical surface of the power screw 10. On rotation of the screws the point 25 on the outer edge 13 of the outer cylindric surface of the power screw will come into contact with the point 25' close to the root of the thread of the idle screw, then an adjacent point 26 on the power screw with the point 26' on the idle screw and the point 27 on the power screw with the point 27' on the idle screw. In similar manner the points 27', 28' and 29' on the rounded part of the idle screw adjacent the outer edge of said screw will one after the other come in contact with the points 27, 28, 29 on the power screw. Amongst all said points only points 29 and 29' are situated on the same or substantially the same distance from the axis of rotation of corresponding screws. On the rotation of the screws the points 29 and 29' will, thus, touch each other without sliding or at least without any essential sliding, whereas all other points have a considerable sliding motion. When now the screws are exactly manufactured so that real contact occurs at all said points, that is between points 25, 26, 27, 28, 29 and intermediate points on the power screw and points 25', 26', 27', 28', 29' on the idle screw no or only a slight wear will occur at the points 29 and 29' but, on the contrary, a more or less considerable wear at other points. Due to the wear a small play is formed along the whole helical surfaces except at the points 29 and 29' where contact still takes place. Thus, the screws tend to grind themselves to the ideal state in which contact only takes place at these points at which the friction is smallest.

By the convex helical surfaces of the power screw 10 fitting tightly to the rounded part 15 of the helical surface of the idle screw 11 the contact between the screws takes place on a surface and not along a line causing a considerable reduction in the leakage which is always to be considered in devices of this type.

As it meets with certain difficulties to manufacture the helical surfaces with such an exactness that only the points 29 and 29' are in contact with each other and the helical surface 27, 28, 29 fits exactly and without friction to the outer edge of the idle screw the above mentioned condition is according to the invention utilized for the manufacture of the screws in such manner that the screws are manufactured only with approximately exact shape or rounding, for instance in such a manner that the surface 15 of the helical surface of the idle screw is barely in contact with the helical surface 12 of the power screw, the rounding of the surface 15 being effected by grinding against said helical surface 12.

Figure 4:
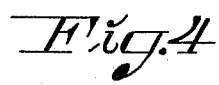
Figure 4 is a modification of Fig. 3.

Fig. 4 illustrates how such a grinding appears. Before the grinding the idle screw 11 has the shape designated by the line 18—22—15—14, and after the grinding it has assumed the ideal shape above described designated by the line 18—15—14 which is manifested by the helical surface of the thread of the screw having been worn adjacent its outer edge along the width 18—15.

According to Fig. 3 the outer edge 16 of the idle screw is rounded corresponding to a similar surface 17 on the power screw. However, the edge of the idle screw may also be acute as shown at 18 in Fig. 4 in which case the power screw must, of course, be shaped in a corresponding manner as shown at 19.

What I claim is:

1. In a screw engine or the like for power transmission to or from a fluid, having at least two intermeshing and cooperating rotatable screws, and a casing surrounding and fitting the outside perimeter of said screws, the feature of having one screw driving and transmitting the main portion of the power and provided with convex helical surfaces upon the thread thereof and the other screw driven and meshing with the first screw simply as a sealing means, the helical surfaces of the thread of said other screw being concave towards the root of the thread and rounded out towards the top of the thread with the concave portion forming a relatively long curved contact portion and the rounded out portion directly connected thereto and forming a relatively short convexly curved contact portion, while the convex helical surfaces of the thread of said one screw are convexly curved towards said top of the thread with a relatively short curved contact portion making contact with the relatively long curved contact portion of said other or concave screw so that positive contact occurs between the outer edge of the convex helical surface of said one screw and the concave portion of the other screw at a point where friction is at minimum.

2. In a screw engine or the like for power transmission to or from a fluid, having at least one driving screw and one driven screw intermeshing and cooperating together, and a casing surrounding and fitting the outside perimeter of said screws, the feature of having the helical surfaces of the thread of the driven screw concave towards the root of the thread and rounded out towards the top of the thread with the concave portion forming a relatively long curved contact portion and the rounded out portion directly connected thereto and forming a relatively short convexly curved contact portion, and having the helical surfaces of the thread of the intermeshing driving screw convex and curved towards the top of the thread with a relatively short curved contact portion adapted to fit and co-act with the relatively long curved contact portion of said driven screw, and with a relatively long convexly curved contact portion directly connected to the relatively short contact portion of said driving screw making contact with the relatively short curved contact portion adjacent to the top of the thread of the driven screw so that positive contact occurs between the screws at a point where friction is at minimum.

CARL OSCAR JOSEF MONTELIUS.